United States Patent [19]

Hansen

[11] Patent Number: 5,512,124
[45] Date of Patent: Apr. 30, 1996

[54] HOT-MELT ADHESIVE THAT HAS GOOD OPEN TIME AT ROOM TEMPERATURE AND CAN FORM CREEP-RESISTANT BONDS

[75] Inventor: Dennis Hansen, City of Luck, Wis.

[73] Assignee: Minnesota Mining and Manufacturing Company, St. Paul, Minn.

[21] Appl. No.: 182,846

[22] Filed: Jan. 14, 1994

Related U.S. Application Data

[63] Continuation of Ser. No. 721,916, Jun. 20, 1991, abandoned, which is a continuation of Ser. No. 190,039, May 4, 1988, abandoned.

[51] Int. Cl.⁶ .............................. C09J 5/00; C09J 123/08
[52] U.S. Cl. ..................... 156/334; 156/327; 428/335; 428/355; 524/272; 524/274
[58] Field of Search ..................... 156/327, 334; 428/335, 355; 524/272, 274

[56] References Cited

U.S. PATENT DOCUMENTS

| | | | |
|---|---|---|---|
| 3,232,895 | 2/1966 | Klein et al. | 524/274 |
| 3,423,342 | 1/1969 | Kendall | 524/272 |
| 3,448,178 | 6/1969 | Flanagan | 525/149 |
| 3,539,481 | 11/1970 | Parker | 524/271 |
| 3,837,994 | 9/1974 | Flanagan et al. | 161/100 |
| 3,875,095 | 4/1975 | Yamada et al. | 524/499 |
| 4,066,600 | 1/1978 | Pletcher et al. | 524/141 |
| 4,146,521 | 3/1979 | Godfrey | 524/274 |
| 4,345,349 | 8/1982 | Flanagan | 412/5 |
| 4,457,457 | 7/1984 | Dziki | 222/146.5 |
| 4,460,728 | 7/1984 | Schmidt, Jr. et al. | 524/271 |
| 4,494,941 | 2/1985 | Aliani et al. | 524/270 |
| 4,613,632 | 9/1986 | Aliani et al. | 523/172 |
| 4,618,640 | 10/1986 | Tsuchida et al. | 524/274 |
| 4,621,748 | 11/1986 | Dziki | 222/146.5 |
| 4,712,808 | 12/1987 | Beh-Forrest et al. | 281/15 |
| 4,749,739 | 6/1988 | Foster et al. | 524/274 |
| 4,874,804 | 10/1989 | Brady et al. | 524/100 |
| 4,907,822 | 3/1990 | Carter et al. | 281/15.1 |
| 4,973,326 | 11/1990 | Wood et al. | 604/391 |
| 4,984,949 | 1/1991 | Reckziegel | 412/8 |
| 5,026,756 | 6/1991 | Arendt | 524/293 |
| 5,041,482 | 8/1991 | Ornsteen et al. | 524/272 |
| 5,310,803 | 5/1994 | Hansen | 524/271 |
| 5,317,070 | 5/1994 | Brant et al. | 525/240 |
| 5,401,792 | 3/1995 | Babu et al. | 524/270 |

FOREIGN PATENT DOCUMENTS

| | | |
|---|---|---|
| 713126 | 7/1965 | Canada . |
| 721439 | 11/1965 | Canada . |
| 0078122 | 5/1983 | European Pat. Off. . |
| 0132291A1 | 1/1985 | European Pat. Off. . |
| 0271254 | 6/1988 | European Pat. Off. . |
| 0340990 | 11/1989 | European Pat. Off. . |
| 0410412 | 1/1991 | European Pat. Off. . |
| 1323377 | 2/1963 | France . |
| 201317 | 7/1983 | Germany . |
| 53-147733 | 12/1978 | Japan . |
| 163174 | 12/1981 | Japan ..................... 524/274 |
| 57-57769 | 4/1982 | Japan . |
| 1095735 | 12/1967 | United Kingdom . |
| 1233797 | 5/1971 | United Kingdom . |
| 1232797 | 5/1971 | United Kingdom . |

OTHER PUBLICATIONS

*Adhesives and Coatings Manual*; U.S.I. Chemicals; 1983; pp. 15, 18, 19, 27, and 28.

1983 Hot Melt Adhesives and Coatings Short Course, Notes of the Technical Association of the Pulp and Paper Industry, pp. 67–73 ("Ex–042; Novel EVA Copolymer for Hot Melt Adhesive Systems," by J. M. Tancrede et al.), Jun., 1983.

Duncan et al., "EVA and VAE Copolymers for Hot Melt PSA's," Adhesive Age, Mar. 1980, pp. 37–41.

*Primary Examiner*—James J. Seidleck
*Assistant Examiner*—Rabon Sergent
*Attorney, Agent, or Firm*—Gary L. Griswold; Walter N. Kirn; Steven E. Skolnick

[57] ABSTRACT

A hot-melt adhesive of ethylene/vinyl acetate copolymer and tackifying resin can be spread into a thin layer that remains tacky for more than 5 seconds, after which a bond can be made without applying heat or more than hand pressure. Within a short period of time, the adhesive crystallizes so that the bond becomes creep-resistant. The temperature at which this hot-melt adhesive can be spread into thin layers is significantly lower than could be used with prior hot-melt adhesives that develop creep resistance.

19 Claims, 1 Drawing Sheet

HOT-MELT ADHESIVE THAT HAS GOOD OPEN TIME AT ROOM TEMPERATURE AND CAN FORM CREEP-RESISTANT BONDS

This is a continuation of application Ser. No. 07/721,916 filed Jun. 20, 1991, now abandoned which is a continuation of application Ser. No. 07/190,039 filed May 4, 1988, now abandoned.

BACKGROUND OF THE INVENTION

1. Field of the Invention

The invention concerns hot-melt adhesives and, more specifically, compositions of ethylene/vinyl acetate and tackifying resin. The invention is particularly concerned with the need for an adhesive which can be applied as a thin layer that remains tacky for a sufficiently long time at room temperature to permit a creep-resistant bond to be made merely by applying ordinary hand pressure.

2. Description of the Related Art

U.K. Pat. Spec. No. 1,233,197 (Cheetham et al.) which was published May 26, 1971 says: "Known hot-melt adhesives for bonding paper stocks are 100% solids systems consisting of, for example, a mixture of an ethylene/vinyl acetate copolymer, a resin and a wax; these adhesives are applied in the molten state and revert to a reversible solid, usually non-tacky, state on cooling . . . although there are some hot-melt adhesives which exhibit a degree of cold tack so that they can be cold bonded; these adhesives are usually wax-free or have a low wax content. It has been found, however, that bonds between paper substrates formed with these adhesives exhibit unacceptable creep or part completely at temperatures of about 50° C. Packs made under such adhesives fail under tropical storage conditions"(page 1, lines 15–38). The Cheetham specification says that both "high cold-tack and resistance to cold-flow at 50° C." can be attained by blending a glycerol ester of highly hydrogenated rosin and a hydrogenated methyl ester of rosin with the ethylene/vinyl acetate. In Example 1, such a blend was applied at 120°–140° C. in thin layers to paper pack blanks which were formed and sealed into packets under a pressure of approximately 7 p.s.i., with a delay as long as 16.8 seconds between the times of applying the adhesive and sealing a packet. The bonds were said to have no tendency to creep or burst open at 50° C., but the forces are not disclosed and apparently were quite small.

By 1980, as reported in Duncan et al., "EVA and EVA Copolymers for Hot Melt PSA's," Adhesives Age, March 1980, pp 37–41:Ethylene/vinyl acetate (EVA) copolymers are well established as the base polymer for hot melt package sealing adhesives. EVA's can be formulated to give a broad range of properties over a wide range of temperatures. . . . The versatility of the 18 to 33 percent vinyl acetate EVA's is attributed to the polymer's dual nature. These EVA copolymers contain a balance of crystalline and non-crystalline regions, which allow them to accept a wide variety of modifiers. . . .

"The crystallinity, which is proportional to the ethylene content, contributes strength and heat resistance. The crystalline regions are compatible with paraffin and microcrystalline waxes. Waxes are used to lower viscosity, adjust open time, and reduce cost."

"The amorphous regions, which result from the presence of vinyl acetate, contribute flexibility and adhesion. . . . At about 45 wt. percent, the polymer becomes completely amorphous. . . . Pressure-sensitive tack is obtained by improving compatibility and reducing polymer crystallinity."

Although some EVA-based adhesives exhibit permanent pressure-sensitivity (as indicated in the Duncan publication), it is believed that no known EVA-based adhesive can be spread onto an unheated substrate as a thin layer about 50 μm in thickness that (1) remains tacky for at least 5 seconds at room temperature and (2) then forms creep-resistant bonds without applying heat or more than hand pressure.

By "tacky" is meant that when contacted with ordinary typing paper under the force of one pass of a 2.2 kg roler, an immediate effort to remove the paper tears the paper. In other words, a 50 layer of adhesive remains sufficiently tacky to tear paper.

Of prior hot-melt adhesives, that which is believed to come the closest to achieving the above combination of properties (1) and (2) is the subject of U.S. Pat. No. 4,613,632 (Aliani et al.), namely, an EVA-based hot-melt adhesive including a resin that functions as a tackifier and also assists wetting. The Aliani adhesive can also contain a wax but preferably is wax-free. The EVA has a vinyl acetate (VA) content of from 11 to 40% by weight and a melt index of from 700 to 10,000 in a wax-free hot-melt system. The Aliani patent makes its test bonds at elevated temperatures, e.g., at 100–150° C. (col. 12, lines 9–11), and at 90° C. (col 14, line 48) and says nothing to indicate whether a thin layer of its adhesive might be tacky at room temperature. However, the Aliani patent say that its adhesive has "open time," and sometimes refers to "open time at 180° C. "(col. 10, line 40) but without further explanation.

Our testing of EVA-based hot-melt adhesives similar to two of the Aliani (one at 27.5% VA content and melt index of 2500 and another at 14% VA content and melt index of 2500 ) shows that when a 3.2 mm bead is extruded at 130° C. the bead retains sufficient heat in a room temperature environment to form a bond for up to two minutes. On the other hand, when the latter Aliani composition was spread onto an unheated substrate as a thin layer of about 50 μm, the layer became nontacky almost instantaneously. When the former Aliani composition was so spread it remained marginally tacky for about 5 seconds but did not wet well enough to form a creep-resistant bond (reported in detail below as comparative Example C-1).

Hot-melt adhesives often are dispensed from a gun-like device such as illustrated in U.S. Pat. No. 4,621,748 (Dziki) which receives a rod of adhesive that is formed with teeth by which the adhesive is mechanically driven into the heated well of the gun-like device. At ordinary room temperatures, the teeth of the rod of adhesive must have sufficient strength to withstand the driving force. A similar dispenser is illustrated in U.S. Pat. No. 4,457,457 (Dziki), but uses a smooth-surfaced rod of adhesive that is driven into the heated well pneumatically. Hence, its rod of adhesive does not need to be as strong as a toothed rod, but it should have sufficient rigidity not to buckle under the pneumatic force.

Hot-melt adhesives are sometimes marketed as nontacky sticks which, when rubbed against a substrate, deposit a thin layer of adhesive that is tacky by virtue of heat generated by the rubbing. Those thin layers can remain tacky for a sufficient period of time to permit bonds to be made under ordinary hand pressure at room temperature. U.S. Pat. Nos. 4,066,600 (Pletcher) and No. 3,539,481 (Parker) concern stick adhesives but do not suggest the use of EVA-based adhesives.

Shear Storage Modulus G'

A thin layer of adhesive 50 μm in thickness is sufficiently tacky to form bonds under ordinary hand pressure at room temperature when its shear storage modulus G' is less than $1 \times 10^6$ dynes/cm$^2$ and can do so more easily when its G' is less than $7 \times 10^5$ dynes/cm$^2$. After the G' of the adhesive layer has increased above $5 \times 10^6$ dynes/cm$^2$, a bond which was made when the adhesive layer was tacky may be creep-resistant. To assure good creep resistance, the ultimate G' should be at least $10^7$ dynes/cm$^2$. For a discussion of shear storage modulus G' see Satas: "Handbook of Pressure-Sensitive Adhesive Technology," Van Nostrand Reinhold Co., N. Y., pp. 82–83.

SUMMARY OF THE INVENTION

The invention provides a hot-melt adhesive that can be deposited from a band-held dispenser onto an unheated surface to form a 50 μm layer that (1) remains tacky for at least 5 seconds at room temperature, and (2) then forms creep-resistant bonds without applying heat or more than hand pressure. Briefly, the hot-melt adhesive of the invention comprises by weight:

(a) an ethylene/vinyl acetate copolymer having from 14 to 35% of vinyl acetate and a melt index of at least 150, and (b) from 50 to 200 parts of tackifying resin per 100 parts of the copolymer, which resin has a ring and ball softening point within the range of from 70° to 115° C. and a combined aromatic and olefinic content within the range of from 0.5 to 50 mole % and is so selected that the adhesive has a shear storage modulus G' of less than $10^6$ dynes/cm$^2$ for more than 5 seconds after being deposited onto an unheated substrate as a 50 μm layer, and the adhesive has an ultimate shear storage modulus G' of at least $5 \times 10^6$ dynes/cm$^2$, In one embodiment of the invention when either the melt index is less than 500 or there are less than 100 parts of the tackifying resin per 100 parts of copolymer, the ring and ball softening point and the combined aromatic and olefinic content are both near the central points of said ranges.

After the novel hot-melt adhesive is melted to permit it to be spread onto an unheated substrate to form a 50 μm layer, it has good open time. That is, the layer remains tacky for at least five seconds, preferably at least 30 seconds, to permit a bond to be made under hand pressure without applying heat or more than hand pressure. Within a few minutes the adhesive crystallizes so that the bond develops creep resistance. That the bond becomes creep-resistant is surprising in view of the fact that thin layers of known EVA-based adhesives which have good open time at room temperature do not provide creep-resistant bonds.

Thin layers of preferred compositions of the novel hot-melt adhesive remain aggressively tacky for about 90 seconds and thus are extraordinarily easy to use. Furthermore, the novel hot-melt adhesive can be spread into thin layers at temperatures significantly lower than could be used with prior hot-melt adhesives that develop creep resistance.

A hand-held dispenser with a nozzle temperature in the range of 95°–120° C. can spread hot-melt adhesives of the invention into thin layers. In contrast, nozzle temperatures of 175°–205° C. are typically used for dispensing prior hot-melt adhesives that form creep-resistant bonds. This reduction in dispensing temperature not only conserves energy, but the user is far less likely to be burned in the event of accidental contact with the molten adhesive. Furthermore, the novel hot-melt adhesive can be applied to surfaces such as styrofoam that cannot withstand high temperatures.

The novel hot-melt adhesives can be marketed as a nontacky stick which, upon being rubbed onto an unheated substrate, deposits a thin layer of adhesive that can form a paper-tearing bond. Furthermore, a stick adhesive of the invention can be so formulated that after being deposited as a thin tacky layer, items to be bonded can be repositioned over a usefully long period of time. When the item to be bonded is a piece of paper that has been correctly repositioned on the deposited layer, one may rub a squeegee over the paper to generate sufficient heat in the deposited layer to permit the adhesive to flow into interstices of the paper, thus creating a bond that is stronger than the paper.

The novel adhesives may also be applied to provide a non-tacky coating on a substrate. The adhesive coating can be activated by being rubbed either before or after being contacted with a material to be bonded. Once activated, the adhesive of the invention retains sufficient tack for a period of time to permit a substrate, such as a piece of paper, to be repositioned.

DETAILED DISCLOSURE

The novel adhesive compositions can be prepared by mixing the components at a temperature somewhat above the softening points of the ingredients using an inert atmosphere blanket.

To provide the above-described extraordinary combination of protracted aggressive tackiness at room temperature and creep-resistant bonding, it is believed that there must be some compatibility between the tackifying resin and each of the ethylene and vinyl acetate moieties in the EVA copolymer. Preferred compatibility between the tackifying resin and the ethylene moiety of the ethylene/vinyl acetate (EVA) copolymer should be realized when the tackifying resin has a combined aromatic and olefinic content of at least 2 mole % as determined by carbon-13 NMR analysis. However, when its aromatic/olefinic content substantially exceeds 30 mole % the tackifying resin may not be sufficiently compatible with the vinyl acetate moiety of the EVA copolymer. Enhanced compatibility also enhances clarity of the adhesive for esthetic purposes and, when clarity is important, no more than 50 mole % of the saturated aliphatic content of the tackifying resin should be cycloaliphatic.

It is theorized that the tackifying resin acts to suppress the shear storage modulus G' and to spread the EVA polymer chains apart, thus suppressing the rate of crystallization of the ethylene segments of the EVA copolymer. It also is theorized that as the amount of hydrogenation in the tackifying resin increases, the compatibility of the resin with the EVA copolymer increases.

The ring and ball softening point (ASTM E-28) of the tackifying resin preferably is no less than 80° C. When the ring and ball softening point is substantially below 80° C., the novel adhesive may not form creep-resistant bonds unless the aromatic/olefinic content is near the central point of the aforementioned preferred range of from 2 to 30 mole %. Preferred tackifying resins include polyterpene resins, hydrogenated wood rosins, and derivatives thereof such as a water-white hydrogenated polyterpene resin series having ring and ball softening points between about 85° and 115° C. and called "Clearon" by Yasuhara Yushi Kogyo Co., Ltd. and "Resin D-2083" from Hercules, Inc. Preferred hydrogenated wood rosins include "Regalite M-33," "Foral 85" and "Foral 105" from Hercules, Inc. Ideally the ring and ball softening point of the tackifying resin does not exceed 105° C., because it can be difficult to attain aggressive tackiness when its softening point is substantially above 105° C.

Preferably there are from 120 to 170 parts of the tackifying resin per 100 parts of the EVA copolymer. Above 170 parts, bonds made with the novel hot-melt adhesive may afford less resistance to impact, while below 120 parts, deposited layers of the adhesive may be less tacky. At either side of that preferred range, the open time or tack bonding range may be shortened.

In order to provide desirably low application temperatures and long open time, the melt index (MI) of the EVA copolymer preferably exceeds 500. No disadvantage has been encountered at higher melt indices although it becomes more difficult and expensive to make an EVA copolymer that has a melt index above about 2500.

To provide the longest open times, the vinyl acetate (VA) content of the EVA copolymer should be from 23 to 30 weight %. Furthermore, when the vinyl acetate content is substantially less than 23%, the novel adhesive is less tacky when spread as a thin layer. When the vinyl acetate content is substantially greater than 30%, thin layers may be tacky without being aggressively so.

BRIEF DESCRIPTION OF THE DRAWING

The invention may be more easily understood in reference to the drawing, the single FIGURE of which is a graph of shear storage modulus G' vs. time for a preferred hot-melt adhesive of the invention and two comparative hot-melt adhesives.

Data points 10 indicate values of shear storage modulus G' for the hot-melt adhesive of Example 1 below, a preferred hot-melt adhesive of the invention. Data points 12 and 14 indicate G' values for comparative Examples C-1 and C-3, respectively. As is pointed out below, comparative Example C-1 substantially reproduces a formulation of Example 13 of the above-cited Aliani patent. Comparative Example C-3 is described below and is not prior art.

Figure 1:
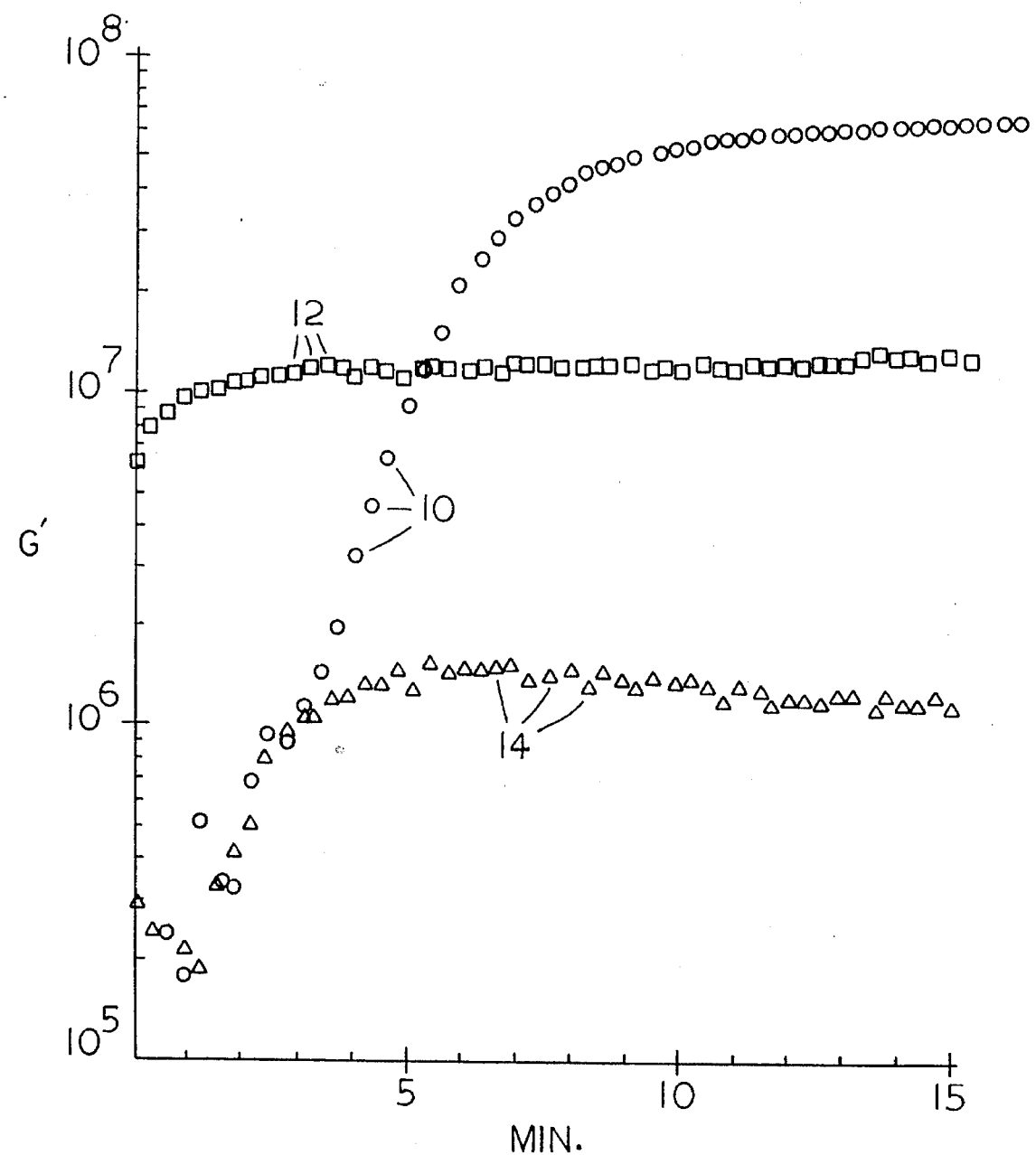

Data points 10 show that the hot-melt adhesive of Example 1 has G' values below $10^6$ dynes/cm$^2$ for about 2 minutes after being deposited as a 50 μm layer and accordingly is tacky for nearly 2 minutes. Data points 10 show that the G' of the adhesive exceeds $5\times10^6$ dynes/cm$^2$ within 5 minutes after being deposited as a 50 μm layer and accordingly forms bonds that become creep-resistant after that period of time.

Data points 12 show that the G' of a 50 μm layer of C-1 is immediately greater than $10^7$ dynes/cm$^2$ and hence bonds cannot be formed by applying ordinary hand pressure at room temperature. Data points 14 show that a 50 μm layer of C-3 never develops a G' as high as $5\times10^6$ dynes/cm$^2$ and so cannot form creep-resistant bonds.

TACK BONDING RANGE

A layer of hot-melt adhesive is deposited at about 110° C. onto ordinary typing paper at a thickness of about 50 μm and a width of 1.9 cm at ordinary room temperature. Another sheet of the paper is placed on the deposited layer, and a 2.2 kg roller is passed once over the sheets at a speed of about 7.5 cm/sec. The bonded sheets are immediately subjected to 180° peel in a "Keil Tester" at a separation rate of 30 cm/min. Paper delamination or tearing occurs at approximately 12 N. The maximum time between depositing the layer and passing the roller that results in tearing is the open time or Tack Bonding Range of the adhesive.

Creep Resistance

Creep Resistance is measured by ASTM Test Method D3654 except that the adhesive layer is deposited as a 50 μm layer onto polyester film from a hot-melt adhesive dispenser and the weight is 1 kg. The test is sometimes discontinued after 10,000 minutes if no failure occurs. A creep-resistant bond will not fail at 1000 minutes. A bond that has good creep resistance will not fail at 10,000 minutes.

EVA Copolymers

Among EVA copolymers that have been used to make hot-melt adhesives of the invention and comparative hot-melt adhesives are

| No. | Trade Designation | Source | Nominal % VA | Nominal Melt Index |
|---|---|---|---|---|
| A | EP 4957-1W | E.I. duPont | 28 | 800 |
| B | EP 4969-2W | " | 28 | 800 |
| C | Escorene 7710 | Exxon Chem. Co. | 28 | 500 |
| D | EX-170 | " | 27.5 | 2500 |
| E | Ultrathene 647-35 | U.S.I Chem. Co. | 28 | 950 |
| F | Escorene 02514 | Exxon Chem. Co. | 14 | 2500 |
| G | AC 400 | Allied Chem Corp. | 15 | NT |

NT = Not tested

Each of these EVA copolymers includes small amounts of materials such as stabilizers, antioxidants, and melt-index modifiers such as isobutylene and propylene. EVA "G" had a Brookfield viscosity of 610 centipoise at 140° C.

Tackifying Resins

Among tackifying resins that have been used to make hot-melt adhesives of the invention and comparative hot-melt adhesives are

| No. | Trade Designation | Source | Arom./olef. cont. (mole %) | Soft. Point (°C.) | Description |
|---|---|---|---|---|---|
| A | Clearon P-85 | Yashuhara Yushi | 2.8 | 85 | hydrog. polyterpene |
| B | Clearon P-105 | " | NT | 105 | " |
| C | Clearon P-115 | " | NT | 115 | " |
| D | Clearon P-125 | " | NT | 125 | " |
| E | Kristalex 3085 | Hercules Inc. | 68.1 | 85 | methylstyrene |
| F | Hercotac LA 95 | " | 42.9 | 93 | arom. hydrocarbon |
| G | Resin D-2083 | " | 25.0 | 83 | arom. mod. terpene |
| H | Foral 85 | " | 6.1 | 85 | hydrog. rosin ester |
| I | Regalrez 1078 | " | 0 | 78 | hydrog. hydrocarbon |
| J | Regalite M-355 | " | 7.4 | 85 | hydrog. wood rosin |
| K | Regalite 7070 | " | 10.7 | 70 | arom. hydrocarbon |
| L | Piccovar L-60 | " | NT | 56–60 | " |
| M | Super Statac 80 | Reichhold | NT | 80 | arom. hydrocarbon |
| N | Escorez 2203 | Exxon Chem Co. | NT | 92 | " |
| O | Hercolyn D | Hercules Inc. | NT | * | hydrog. rosin ester |

*liquid
NT = not tested

The saturated aliphatic content of each tackifying resin is the difference between 100% and the aromatic/olefinic content ("Arom/olef. cont.") given above.

In the following examples, all parts are by weight.

EXAMPLE 1

A melt of 100 parts EVA Copolymer A and 150 parts Tackifying Resin A was heated under a blanket of nitrogen to about 149° C. with hand mixing. After about 5 minutes at this temperature, the melt was poured into a mold and allowed to cool to provide a toothed rod of adhesive as illustrated in the above-cited Dziki U.S. Pat. No. 4,621,748. Testing is reported in Table I.

EXAMPLES 2–5

Additional toothed adhesive rods were made as in Example 1 except using different EVA copolymers as indicated in Table I. Table I also lists the results of testing each of these adhesives.

Comparative Examples C-1 and C-2

Also reported in Table I are tests of two EVA adhesives (Comparative Examples C-1 and C-2) made to duplicate as closely as possible two formulations of the above-cited Aliani patent that are believed to come the closest to achieving the objectives of the present invention. Exact duplication was not possible because of the commercial unavailability of the EVA resins used by Aliani. Comparative C-1 is an effort to duplicate Aliani Example 13 at the EVA:resin ratio of 60:40. Comparative C-2 is an effort to duplicate the formulation of Table 7 that uses "Super Statac 80" tackifying resin.

Comparative Examples C-3 and C-4

Also reported in Table I are tests of an EVA adhesive (not prior art) which can be spread to form a 50 μm layer that remains aggressively tacky for at least 5 seconds at room temperature but does not form a creep-resistant bond and is called comparative Example C-3. Comparative Example C-4 is the same as Example 1 of the above-cited Cheetham patent specification.

TABLE I

| Example No. | EVA Copolymer No. | Tackifying Resin No. | Amount | Tack Bonding Range (sec.) | Creep Resistance (min.) |
| --- | --- | --- | --- | --- | --- |
| 1 | A | A | 150 | 75–90 | >40,000 |
| 2 | B | A | 150 | 10–30 | >40,000 |
| 3 | C | A | 150 | 25–30 | >40,000 |
| 4 | D | A | 150 | 210–225 | 4,100 |
| 5 | E | A | 150 | 135–150 | >10,000 |
| C-1 | D | N | 67 | ~5 | 60* |
| C-2 | F | M | 43 | ~0 | NT |
| C-3 | A | L | 150 | 300–330 | 25 |
| C-4 | G | O/H | 50/200 | ~2 | 100* |

*adhesive failure, indicating poor wetting
NT = not tested

EXAMPLES 6–8

A series of hot-melt adhesives were prepared as in Example 1 except using tackifying resins which differed from that of Example 1 only in their ring and ball softening points. Test results are shown in Table II.

TABLE II

| Example No. | EVA Copolymer No. | Tackifying Resin No. | Resin Softening Point (°C.) | Tack Bonding Range (sec.) |
| --- | --- | --- | --- | --- |
| 1 | A | A | 85 | 75–90 |
| 6 | A | B | 105 | 20–25 |
| 7 | A | C | 115 | 2–5 |
| 8 | A | D | 125 | 1–2 |

EXAMPLES 9–15

A series of hot-melt adhesives were prepared as in Example 1 except using various tackifying resins with EVA Copolymer A as indicated in Table III. The values for Tack Bonding Range in Table III show the benefit of employing a tackifying resin that has an aromatic/olefinic content between 2 and 30 mole %, but the comparison is not rigorous due to other differences in the tackifying resins.

TABLE III

| Example No. | EVA Copolymer No. | Tackifying Resin No. | Arom./olef. cont. (mole %) | Tack Bonding Range (sec.) |
| --- | --- | --- | --- | --- |
| 9 | A | I | 0 | 2 |
| 1 | A | A | 2.8 | 75–90 |
| 10 | A | H | 6.1 | 300–330 |
| 11 | A | J | 7.4 | 60 |
| 12 | A | K | 10.7 | 240–300 |
| 13 | A | G | 25.0 | 120–135 |
| 14 | A | F | 42.9 | 25 |
| 15 | A | E | 68.1 | 0 |

EXAMPLES 16–25

A series of hot-melt adhesives were prepared as in Example 1, all employing the EVA Copolymer A and Tackifying Resin A except that the amount of tackifying resin was varied as indicated in Table IV.

TABLE IV

| Example No. | Tackifying Resin Amount | Tack Bonding Range (sec.) |
| --- | --- | --- |
| 16 | 50 | 10 |
| 17 | 100 | 45 |
| 18 | 120 | 45–60 |
| 19 | 130 | 60 |
| 20 | 140 | 75–90 |
| 1 | 150 | 75–90 |
| 21 | 160 | 75–90 |
| 22 | 170 | 75 |
| 23 | 180 | 60 |
| 24 | 200 | 15 |
| 25 | 300 | no bond |

EXAMPLES 26–27

Two hot-melt adhesives were prepared, differing from each other only by the amount of tackifying resin per 100 parts EVA except that the hot-melt adhesive of Example was modified by the addition of 2% by weight of "Paraflint RT" wax (a microcrystalline wax from Moore & Munger Marketing Inc.). This modification reduced the Tack Bonding Range, increased the hardness, and reduced the adhesion of this adhesive. Testing of these adhesives is reported in Table V.

TABLE V

| Example No. | EVA Copolymer No. | Tackifying Resin | | Tack Bonding Range (Sec) |
| --- | --- | --- | --- | --- |
| | | No. | Amt. | |
| 26 | B | G | 100 | 5 |
| 27 | B | G | 200 | 2 |

EXAMPLE 28

An adhesive rod for a gun-like dispenser was formed by coextruding equal portions of the compositions of Examples 26 and 27 to produce a toothed rod with the adhesive of Example 27 at its core and the adhesive of Example 26 at its surface. The teeth of the rod permitted its use with the hand-held dispensing device of the above-cited U.S. Pat. No. 4,621,748.

Part of the rod was mechanically driven into the heat chamber of the dispensing device where the two portions of the adhesive became blended, and the blend was dispensed as a thin layer which had a thickness of about 50 μm and a Tack Bonding Range of about 20–30 seconds. A 50 μm layer of a blend of equal parts of the hot-melt adhesives of Examples 26 and 27 exhibited Creep Resistance greater than 40,000 minutes.

Because the hot-melt adhesives of each of Examples 26 and 27 crystallize quickly, the coextruded rod of Example 28 can be manufactured at faster production rates than could a blend of Examples 26 and 27. Furthermore, the coextruded rod would release better from a mold, as compared to a rod of the blend of Examples 26 and 27, and would have better strength and rigidity. It is surprising that these advantages can be realized while also benefiting from the relatively slow rate of crystallization and consequent long Tack Bonding Range of the blend obtained upon dispensing the coextruded rod.

EXAMPLE 29

The hot-melt adhesive of Example 1 was formed into a stick which when rubbed onto a sheet of ordinary typing paper deposited a thin layer of adhesive that had a Tack Bonding Range of about 20 seconds. Then for a period from about 20 to 120 seconds, the deposited layer stayed sufficiently tacky to permit another sheet of paper to be repositionably adhered. At any later time, rubbing of the covering paper by hand using a squeegee would heat the deposited layer to permit the adhesive to flow into interstices of the paper, after which the two sheets could not be peeled apart by hand without tearing paper.

EXAMPLE 30

The hot-melt adhesive of Example 1 was extruded onto single-ply corrugated cardboard at a temperature of about 90° C. to deposit a bead about 3 mm in diameter. When another piece of the cardboard was laid over the bead, the application of hand pressure formed a bond of sufficient strength to prevent the two pieces from being peeled apart by hand without tearing cardboard, even when the bead was allowed to stand at room temperature for as long as six minutes before forming the bond.

EXAMPLE 31

The hot-melt adhesive of Example 1 was extruded onto various unheated, nonporous substrates to deposit a bead about 1 cm in diameter. Over this was laid a canvas strip which was hand rolled to spread the bead to a width of about 3.5 cm. After standing at room temperature for about 24 hours, the bonded area was trimmed to a width of 2.5 cm, and the bond was subjected to 180° peel in an "Instron" tester at a crosshead speed of 5.08 cm/min. The nonporous substrates were:

ABS (acrylonitrile/butadiene/styrene)
Rigid polyvinyl chloride
Polystyrene
"Plexiglas" (polymethylmethacrylate)
Cold-rolled steel In each case, the adhesive failed adhesively at the canvas at a force exceeding 1.75 kN/m.

In addition to ethylene and vinyl acetate, the EVA copolymer may be made with other copolymerizable monomers such as isobutylene and various polymerization modifiers in minor amounts that do not drastically change the properties of the copolymer. Certain copolymerizable monomers can enhance the performance of the novel adhesive for specific uses. For example, the addition of up to about 2% by weight of methacrylic acid monomer has provided enhanced adhesion to metals.

The novel hot-melt adhesive can be compounded with small amounts of various materials that customarily have been used in adhesive formulations, e.g., paraffin and microcrystalline waxes, reinforcing resins of suitable softening points, stabilizers, antioxidants, pigments, and other fillers such as talc and clay. To avoid any substantial reduction in the bonding time or the ultimate strength of the bonds, any such supplementary materials preferably do not together amount to more than 25% by weight of the novel hot-melt adhesive.

I claim:

1. A method for adhesively bonding a first substrate to a second substrate, the method comprising the steps of:
   (a) providing a first substrate;
   (b) applying to the first substrate in a thin layer about 50 μm thick and in molten form, a hot melt adhesive comprising by weight:
      (1) an ethylene/vinyl acetate copolymer having from 14 to 35 weight % vinyl acetate and a melt index of at least 500, and
      (2) from 50 to 200 parts of a tackifying resin per 100 parts of the copolymer, which resin has a ring and ball softening point within the range of from 70° to 115° C. and a combined aromatic and olefinic content within the range of from 0.5 to 50 mole %;
   (c) cooling the thin layer of the molten hot melt adhesive until it is no longer molten, wherein the non-molten thin layer of adhesive remains tacky for 5 seconds to about 330 seconds at room temperature; and
   (d) applying a second substrate to the tacky, non-molten thin layer of adhesive in step (c) to adhesively bond the first substrate to the second substrate.

2. A method according to claim 1 wherein the ring and ball softening point of the tackifying resin is between about 80° and 105° C.

3. A method according to claim 1 wherein the tackifying resin has an aromatic/olefinic content between about 2 and 30 mole %.

4. A method according to claim 1 wherein the tackifying resin is selected from the group of materials consisting of polyterpene resins, hydrogenated wood rosins, and derivatives thereof.

5. A method according to claim 1 wherein there are from 120 to 170 parts of the tackifying resin per 100 parts by weight of the ethylene/vinyl acetate copolymer.

6. A method according to claim 1 wherein the vinyl acetate content of the ethylene/vinyl acetate copolymer is from 23 to 30 weight %.

7. A method according to claim 1 wherein no more than 50 mole % of the saturated aliphatic content of the tackifying resin is cycloaliphatic.

8. A method according to claim 1 wherein the hot melt adhesive consists essentially of by weight:

(1) an ethylene/vinyl acetate copolymer having from 14 to 35 weight % vinyl acetate and a melt index of at least 500, and (2) from 50 to 200 parts of a tackifying resin per 100 parts of the copolymer, which resin has a ring and ball softening point within the range of from 70° to 115° C. and a combined aromatic and olefinic content within the range of from 0.5 to 50 mole %.

9. A method according to claim 1 wherein the thin layer of the molten hot melt adhesive is cooled to about room temperature in step (c).

10. A method according to claim 1 wherein the thin layer of non-molten adhesive remains tacky for 30 to 330 seconds at room temperature.

11. A method according to claim 1 wherein the adhesive bond formed in step (d) has a creep resistance of at least 1,000 minutes.

12. A method according to claim 11 wherein the adhesive bond formed in step (d) has a creep resistance of at least 10,000 minutes.

13. A method according to claim 1 wherein the hot melt adhesive is applied to the first substrate by extruding the adhesive.

14. A method according to claim 13 wherein the hot melt adhesive is extruded from a handheld dispenser.

15. A method according to claim 1 wherein the hot melt adhesive is in the form of a stick and the hot melt adhesive is applied to the first substrate by rubbing the stick of adhesive against the first substrate.

16. A method according to claim 1 wherein the hot melt adhesive is applied to the first substrate from a dispenser at a nozzle temperature of about 95° to 120° C.

17. A method according to claim 1 wherein the second substrate is applied to the thin layer of the tacky, non-molten adhesive in step (d) without applying heat.

18. A method according to claim 1 wherein the first substrate is otherwise unheated when the hot melt adhesive is applied to it.

19. A method according to claim 1 further comprising the steps of allowing the thin layer of adhesive in step (c) to also become non-tacky and, before applying the second substrate in step (d), rendering the non-molten thin layer of adhesive tacky again.

\* \* \* \* \*